US011387854B2

(12) United States Patent
Sen

(10) Patent No.: US 11,387,854 B2
(45) Date of Patent: Jul. 12, 2022

(54) HUMAN BODY COMMUNICATION INTERFERENCE REJECTION SYSTEM

(71) Applicant: Purdue Research Foundation, West Lafayette, IN (US)

(72) Inventor: Shreyas Sen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 925 days.

(21) Appl. No.: 15/915,029

(22) Filed: Mar. 7, 2018

(65) Prior Publication Data

US 2019/0379414 A1 Dec. 12, 2019

Related U.S. Application Data

(60) Provisional application No. 62/468,333, filed on Mar. 7, 2017.

(51) Int. Cl.
*H04B 1/10* (2006.01)
*H04B 1/12* (2006.01)
*H04B 13/00* (2006.01)

(52) U.S. Cl.
CPC .............. *H04B 1/12* (2013.01); *H04B 13/005* (2013.01)

(58) Field of Classification Search
CPC ...... H04B 1/10; H04B 1/1027; H04B 1/1036; H04B 1/109; H04B 1/12; H04B 1/123; H04B 13/005
See application file for complete search history.

(56) References Cited

U.S. PATENT DOCUMENTS 10,873,354 B2 * 12/2020 Sen ....................... H04B 1/0007
10,998,925 B2 * 5/2021 Sen ........................ A61B 5/683

\* cited by examiner

*Primary Examiner* — Siu M Lee
(74) *Attorney, Agent, or Firm* — Purdue Research Foundation

(57) ABSTRACT

A communication interference rejection system, comprising a dual data rate (DDR) receiver operatively connected to a device connected to a body of a user. The DDR receiver is configured to receive a signal transmitted through the body of the user, with the signal comprising a relatively substantially small constant amplitude component and a relatively large sinusoidal or modulated interference component, said interference component due to human body antenna effect. The receiver integrates the signal and sample at a sampling time, with the sampling time defined as $T_s = n/F_{interference}$, wherein $F_{interference}$ is the frequency of the modulated interference component and n is an integer.

10 Claims, 11 Drawing Sheets

PWM IR-HBC proposal for decoupled data-rate with interference suppression frequency

HUMAN BODY COMMUNICATION INTERFERENCE REJECTION SYSTEM

CROSS REFERENCE TO RELATED APPLICATIONS

The present U.S. patent application is related to and claims the priority benefit of U.S. Provisional Patent Application Ser. No. 62/468,333, filed Mar. 7, 2017, the contents of which are hereby incorporated by reference in their entirety into the present disclosure.

TECHNICAL FIELD

The present disclosure is related to electronic communication systems, and more specifically, to electronic authentication systems which use the human body as part of a signal transmission path.

BACKGROUND

The continuous reduction of size of unit computing, has propelled the growth of wearable sensors and computing devices (e.g. Fitness trackers, Smart watches). Soon, the human body will become a platform for interconnected wearable smart devices, which will aid and improve human quality of life. This calls for efficient ways to connect these wearable devices on the human body. Moreover, since each individual will be wearing a large amount of information on their body (i.e., the Human Intranet), they can now transmit this information to other humans or machines (Human Internet) at their will or use this information for secure authentication. Such on-body wearable devices are typically interconnected using a wireless body area network (WBAN). Human Body Communication (HBC) has recently emerged as a strong contender for this human body network, as it provides ultra-low power (ULP) and increased security, compared to WBAN. ULP is achieved as human body is used as a conducting medium, which exhibits significantly lower loss than radio frequency propagation through air. HBC is more secure as the information is contained within the human body and cannot be snooped on unless the person is physically touched, unlike WBAN, where the wireless signals can be easily snooped on by an attacker.

One disadvantage of HBC is that the human body acts as an antenna at the FM frequency band. This has been the biggest bottleneck in high-speed ULP HBC implementation. Signaling techniques that allow circumvention of the interference, such as adaptive frequency hopping (AFH) and fixed narrowband signaling have been proposed. However, such system provide no way to suppress the interference other than avoiding it using adaptive/fixed narrowband signaling, which leads to energy-inefficient implementation and requires bulky filters. Therefore, improvements are needed in the field.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Various aspects relate to communication systems utilizing the human body as an electrical signal pathway.

The present disclosure provides an authentication system which utilizes an adaptive broadband non-return-to-zero (NRZ) signaling scheme, which suppresses undesired interference by using resettable integration with a dual data rate (DDR) NRZ receiver.

In view of the foregoing, various aspects provide improved reliability of an electronic communication system. A technical effect is to electronically determine and record the identity of a first person who has made physical contact with the body of a second person.

Figures 1A, 1B, 1C:
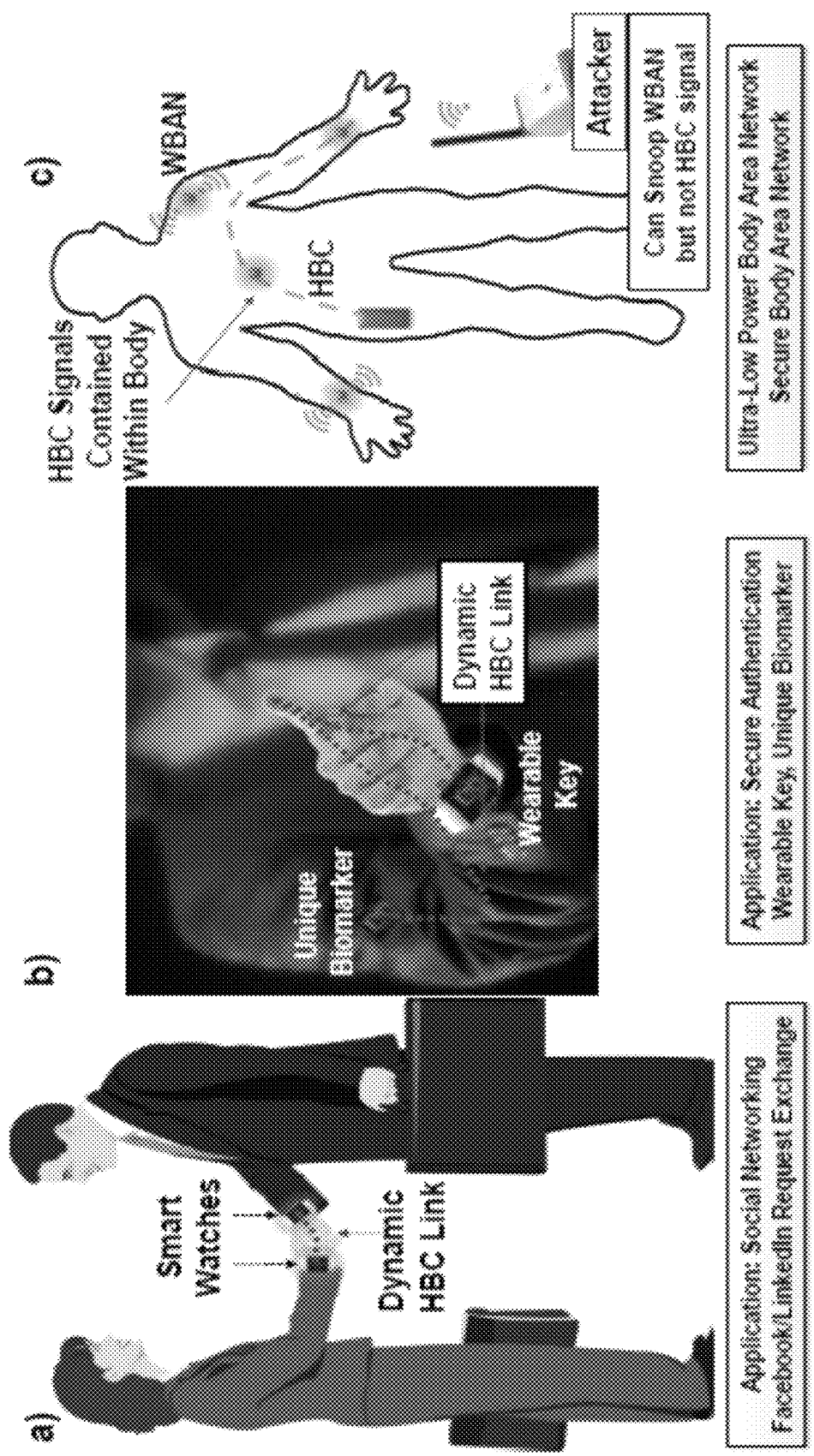
FIG. 1A depicts an interaction between two users shaking hands according to one embodiment.
FIG. 1B depicts a user being authenticated by a wearable key according to one embodiment.
FIG. 1C depicts an HBC network which is immune to attack from wireless signals.

FIGS. 1A, 1B and 1C shows examples of a social introduction where two people are shaking hands. According to one embodiment, HBC is utilized to communicate between two electronic devices worn on the bodies of the individuals, and to securely authenticate and record data related to the individuals. In certain embodiments, HBC is further used to record the data in a social media account, such as Facebook, LinkedIn, or Twitter. Such inter-body information exchange may be implemented in various embodiments. For example, according to one embodiment, at a party, a person might want to exchange Facebook friend requests with another person. By turning on a software switch in the smartwatch, the person could allow Facebook friend request exchange with every person he/she shakes hand with in the party. He/she can then choose to accept or reject the requests individually, at their convenience, on the smart watch or on a computer (synced by the smart watch), by going through the list of received requests. Similarly, in a more professional setting, such as a meeting or a conference, LinkedIn contacts or business cards could be exchanged using dynamic HBC between smartwatches. The amount of information shared could be controlled using an application on the smartwatch.

In a further embodiment, HBC may be used to provide authentication of a user when the user touches an external authentication device. The authentication device then communicates with a device worn by the user, or a unique biomarker work by the user, over the HBC connection.

Figure 2:
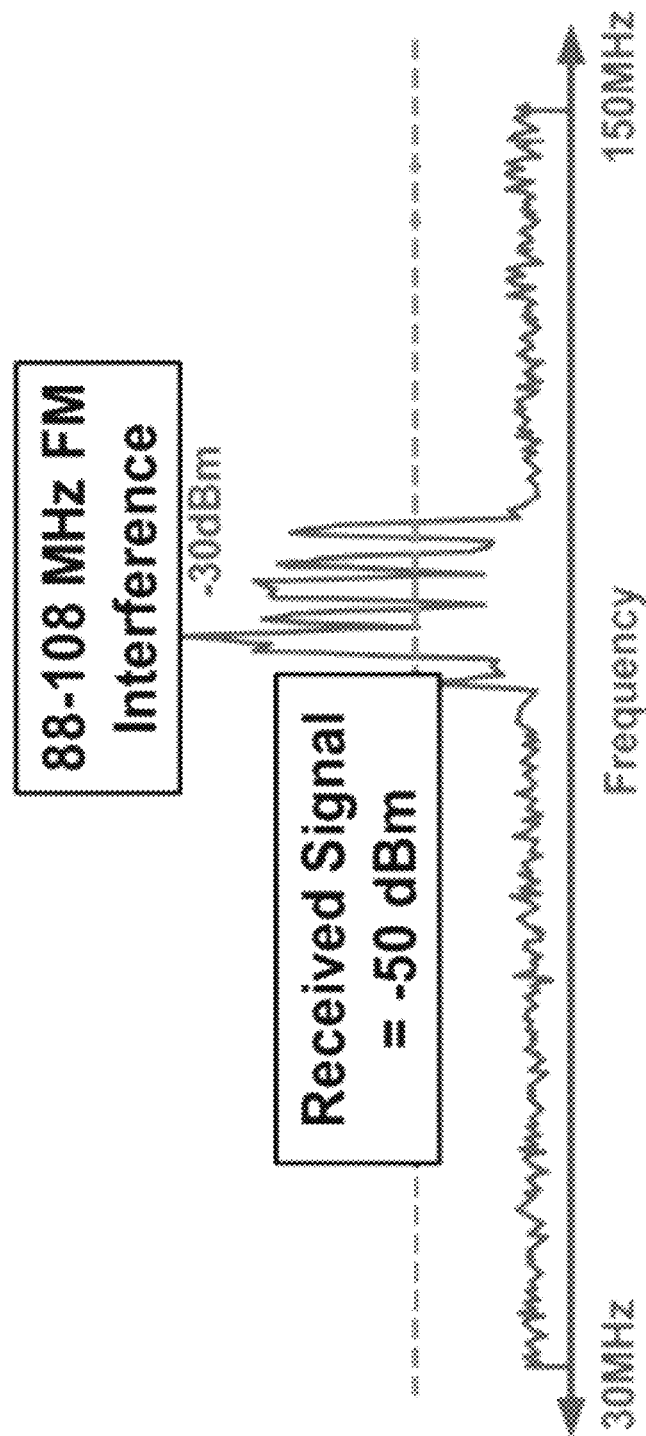
FIG. 2 is a plot which illustrates that the human body acts as an antenna for certain frequency ranges that are utilized in HBC.

FIG. 2 illustrates that the human body acts as an antenna for certain frequency ranges that are utilized in HBC. For example, a ~6 ft tall human body will pick up $$f_{int} = \frac{c}{2l} = 80 \text{ MHz},$$

i.e. the human body is susceptible to strong interference for an electromagnetic (EM) signal whose frequency is determined by the wavelength equal to twice of the human height. Similarly, a grounded human body will be susceptible to $$f_{int} = \frac{c}{4l} = 40 \text{ MHz}$$

EM signal as interference. In reality, the human body acts like a lossy conductor leading to a broadband resonance peaking. Hence, the human body acts like an antenna in the 40-400 MHz frequency range.

Incidentally, the FM radio frequency band (88-108 MHz) falls right inside this frequency band. FIGS. 3A to 3F illustrate a measurement of an example interference spectrum experienced by the body, without the Cordless and Walkie-Talkie interference that were intentionally introduced in the original measurement. The FM signals are omnipresent due to its ubiquitous nature.

Figures 3A, 3B, 3C:
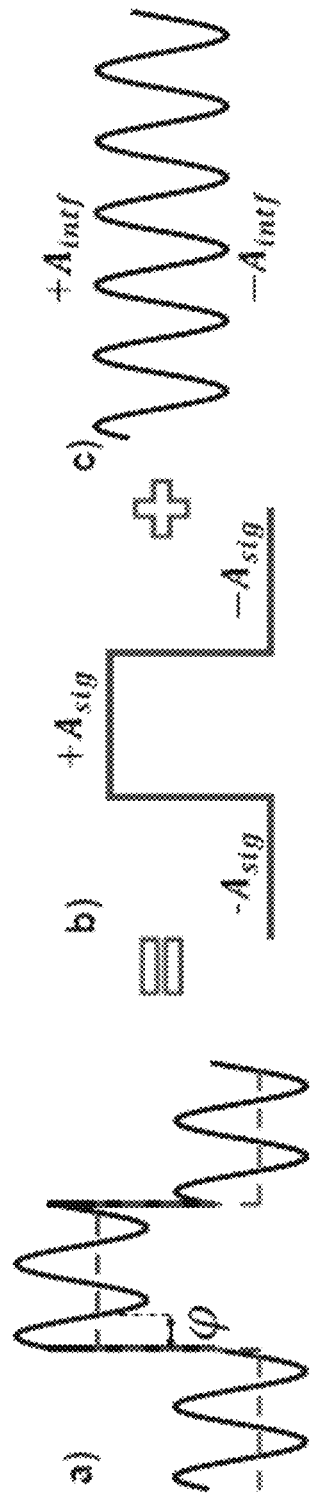
FIG. 3A depicts a signal which is a combination of an NRZ communication signal and a continuous-wave (CW) interference signal.
FIG. 3B depicts an NRZ communication signal.
FIG. 3C depicts a continuous-wave (CW) interference signal.
Figures 3D, 3E, 3F:
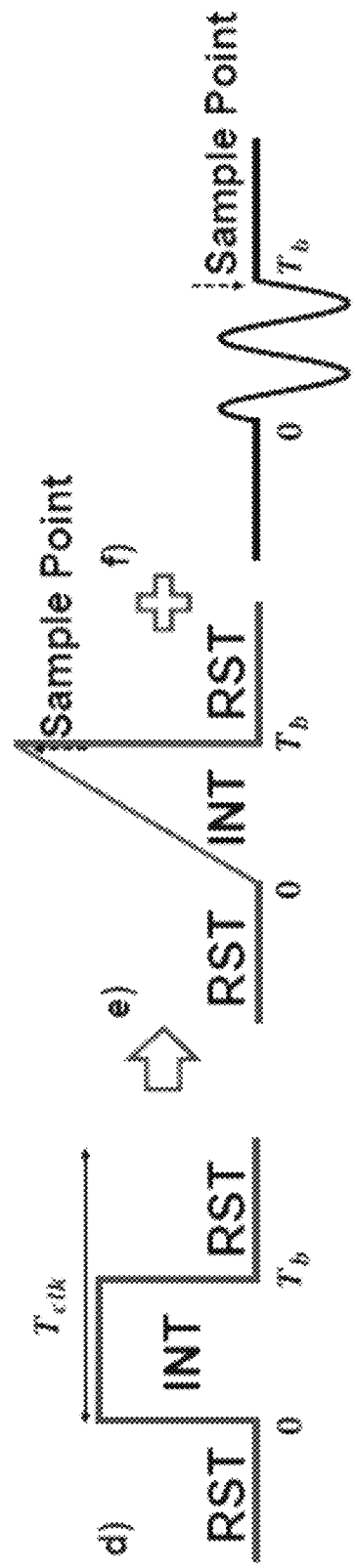
FIG. 3D depicts an integration clock signal.
FIG. 3E depicts an integrated signal.
FIG. 3F depicts the resulting sampled signal.
Figure 6:
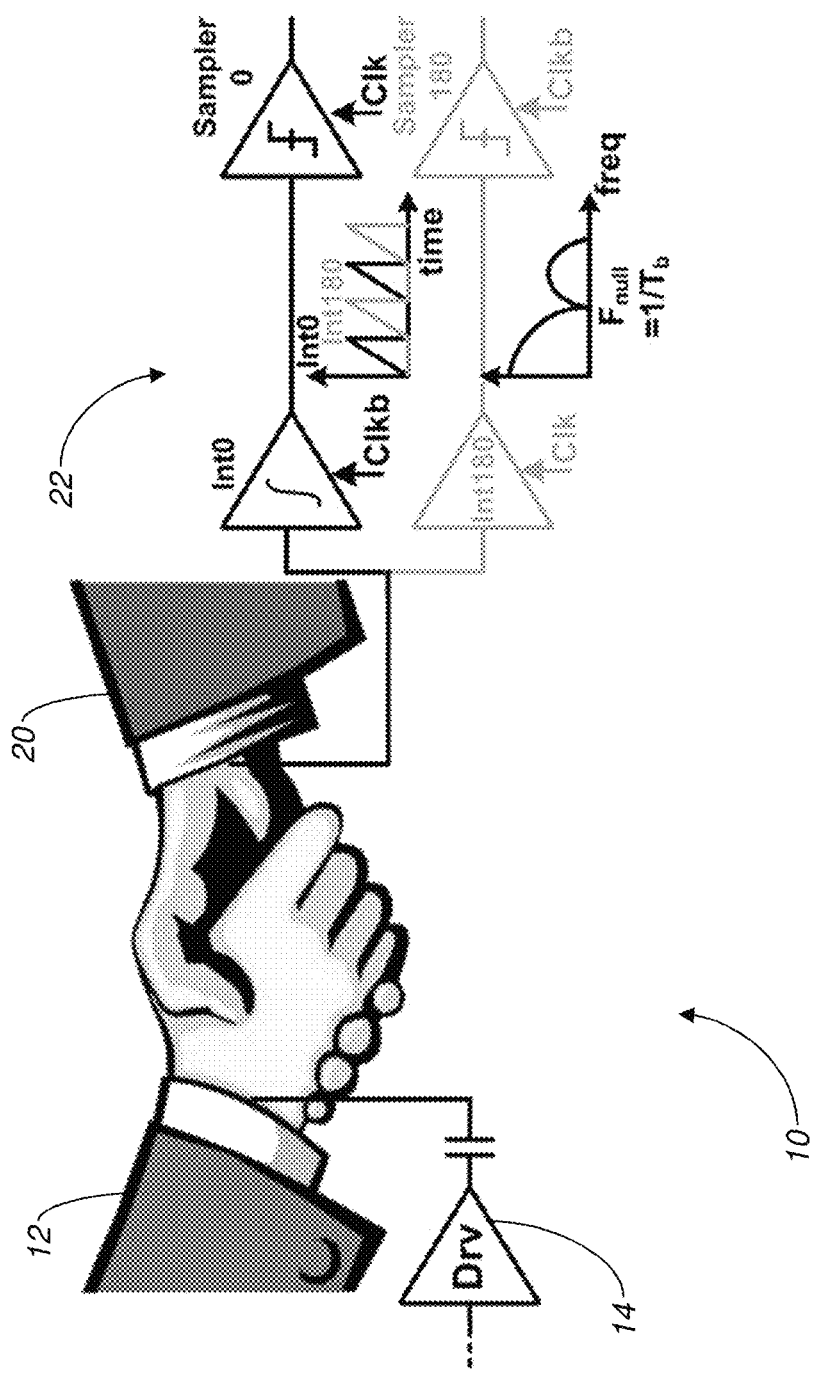
FIG. 6 shows a DDR receiver system according to one embodiment.

Consider a NRZ communication signal (FIG. 3B) which has been combined with a continuous-wave (CW) interference signal (FIG. 3C) for simplicity of analysis. The combined time-domain waveform is shown in FIG. 3A. It can be considered as the superposition of the NRZ signal (FIG. 4A) and a CW interference signal (FIG. 3C). Also consider that there is an arbitrary phase difference ($\varphi$) between the NRZ and the interference. Often, the interference strength ($A_{intf}$) is significantly larger than the signal amplitude ($A_{sig}$), leading to a closed eye-diagram, making it impossible to sample accurately. To overcome this deficiency, according to one embodiment, the presently disclosed system first integrates the received signal+interference for the bit-period ($T_b$) and then samples. The integration clock, shown in FIG. 3D, is a 50% duty cycle clock running at half the bit frequency (i.e. $T_{clk}=2T_b$). Hence, every other symbol can be integrated using one phase of the clock, leading to a dual data rate (DDR) receiver, as shown in FIG. 6. The system can be analyzed by writing the received signal ($S_{RX}$) as a linear superposition of desired NRZ signal ($S_{sig}$) and the undesired interference ($S_{intf}$), as $S_{RX}=S_{sig}+S_{intf}$. Now $S_{sig}$ and $S_{intf}$ can be described as:

$$S_{sig}(t) = \pm A_{sig} \quad 0 \le t \le T_b$$

$$S_{intf}(t) = A_{intf}\sin(\omega_i t + \varphi) \ \forall \ t$$

$$\omega_i = \frac{2\pi}{T_i} = \text{Interference Frequency}$$

Hence the integrated component (IS) of the signal and interference for the 0 clock phase can be written as: ($K_{int}$=Integrator Gain)

The sampled signal+interference at the end of the bit period (i.e., at time $t=T_b$) can be expressed as:

$$IS_{sig}(t) = \int_0^t S_{sig} = \begin{cases} \pm K_{int} A_{sig} t, & 0 \le t \le T_b \\ 0, & T_b \le t \le 2T_b \end{cases}$$

$$IS_{intf}(t) = \int_0^t S_{intf}$$
$$= \begin{cases} -K_{int}\dfrac{A_{intf}\cos(\omega_i t + \varphi)}{\omega_i} & 0 \le t \le T_b \\ 0, & T_b \le t \le 2T_b \end{cases}$$

Figure 4:
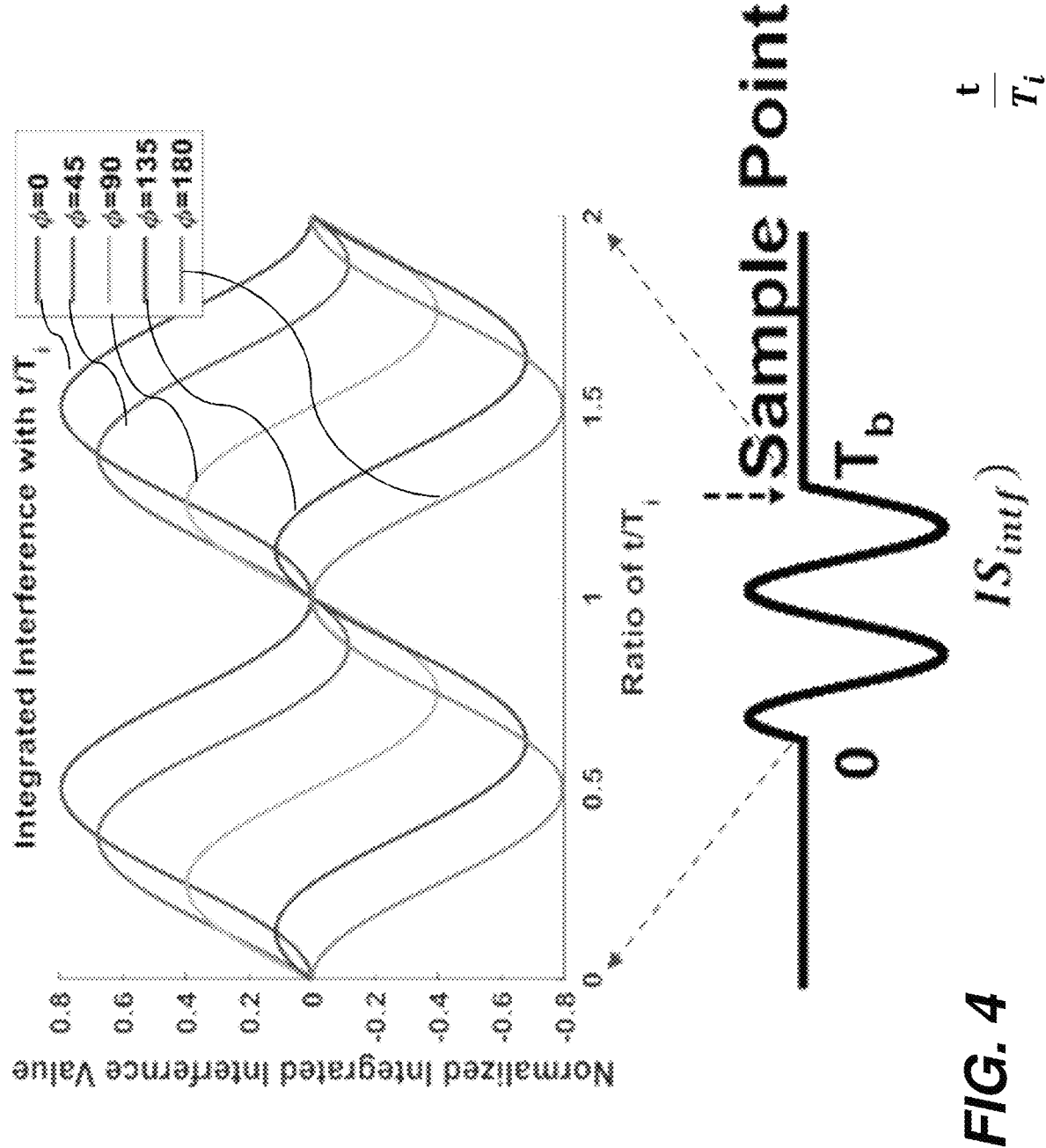
FIG. 4 is a plot showing the normalized integrated interference signal values.
Figure 5:
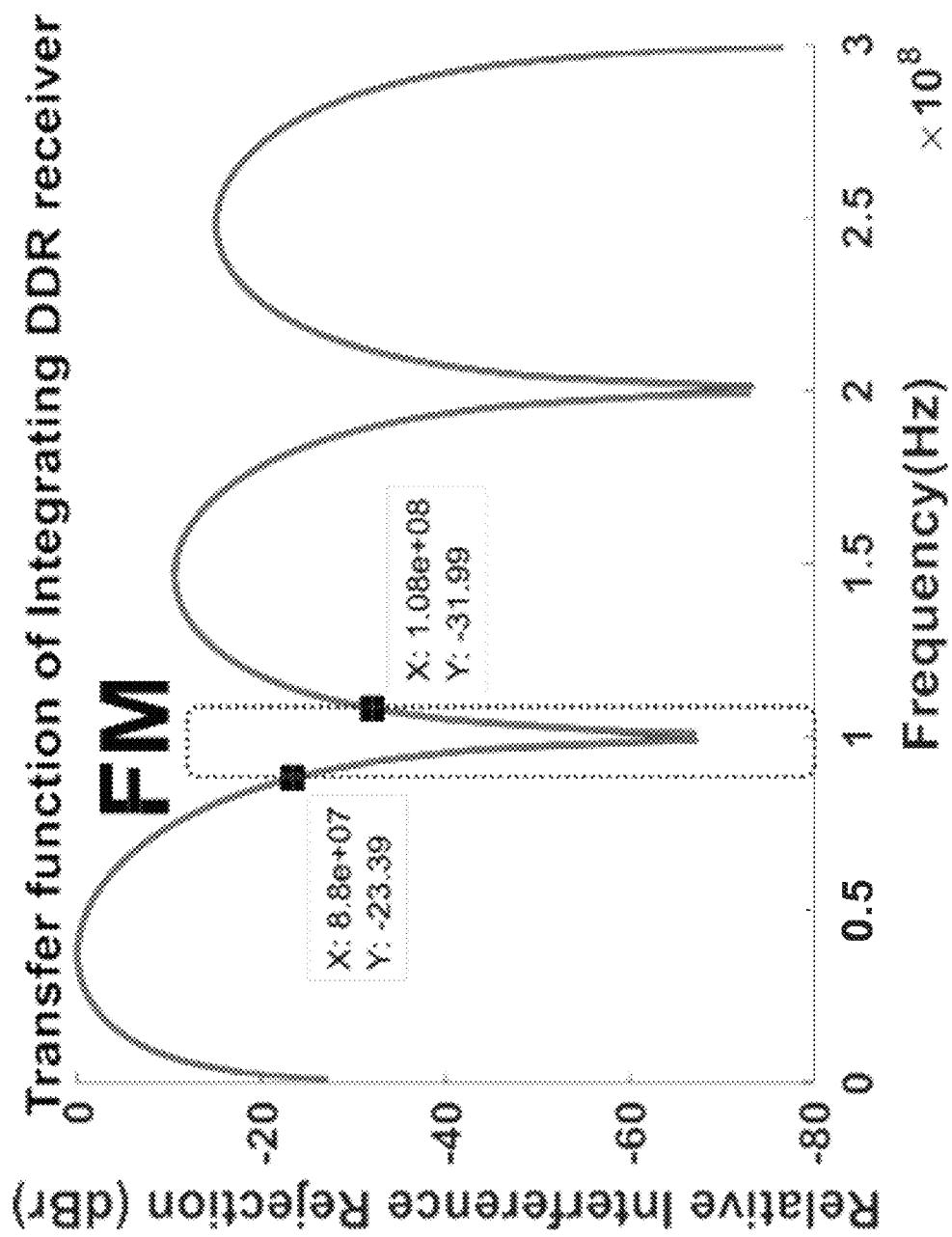
FIG. 5 is a plot showing the relative interference rejections based on frequency.

It should be noted, if $T_b=nT_i$, for any arbitrary $\varphi$, the contribution of the interference to the integrated and sampled signal will be 0. In other words, by choosing the bit period equal of the NRZ signal as an integer multiple of the period of the interfering signal, the contribution of the interference can be nullified. As a result, the DDR receiver may be used as a notch filter to suppress the FM interference in HBC. FIG. 4 shows the case where $T_b=2T_i$. To visualize this relationship, the integrated interference ($IS_{intf}$) is plotted in FIG. 5, for $0 \le t \le T_b$ and varying $\varphi$. The function value varies depending on $\varphi$, for all t, except $T_b=nT_i$, where it is 0. The contribution from the interference term is given by and is plotted in FIG. 6, showing the relative interference rejection (in dBr) that can be achieved using the above technique with varying bit rate ($T_b$), with respect to interference frequency ($1/T_i$). As shown, the presently disclosed DDR receiver provides >20 dB rejection over the FM band, for a 100 Mbs NRZ signal.

The above analysis highlights the efficacy of a resettable integrator as a notch filter for a CW interferer. Furthermore, the above method allows the use of secured lower-power broadband signals for the communication, due to the improved interference rejection. Prior art systems require much higher power levels using a narrow band frequency range signal in order to achieve the desired signal-to-noise ratio, and are therefore less secure. The broadband communication through human body enhances the physical security (i.e. signals are not physically present to a nearby adversary).

FIG. 6 shows an HBC communication system 10 according to one embodiment. The system includes a transceiver which is contained in a smartwatch or other or implanted device worn by each of two people performing an interaction. The transceiver includes a voltage mode driver circuit 14 and a DDR receiver 22. While the two people are making physical contact (e.g., when shaking hands), the driver circuit 14 of the transceiver located in the device worn by the first person 12 capacitively couples a non-return to zero (NRZ) data signal onto the body of the first person 12. The receiver 22 on the wrist or other body area of the second person 20 then picks up a composite signal which comprises both the NRZ data signal and an interference signal (e.g., a sinusoidal modulated signal as discussed above). The receiver 22 is an integrating receiver which performs interference suppression as discussed above. Each path integrates for one bit-period ($T_b$) and then resets for the next bit period. It follows that two paths (corresponding to 0 and 180 phase of the clock) are needed, so a dual data rate (DDR) receiver is used as the receiver 22. The integrated signal is sampled at the falling edge of the integration clock using a strong-arm latch based sampler. The receiver suppresses any spurious signal at $f_{null}=1/T_b$, as derived hereinabove. Put another way, the DDR receiver 22 integrates the received composite signal and samples at a sampling time, where the sampling time is defined as $T_s=1/F_{interference}$, wherein $F_{interference}$ is the frequency of the modulated interference component. In this way, the DDR receiver 22 cancels out the interference component and greatly increases the signal to interference ratio (SIR) of the system. The frequency of the notch can be adjusted by choosing the bit rate appropriately.

Figure 7A:
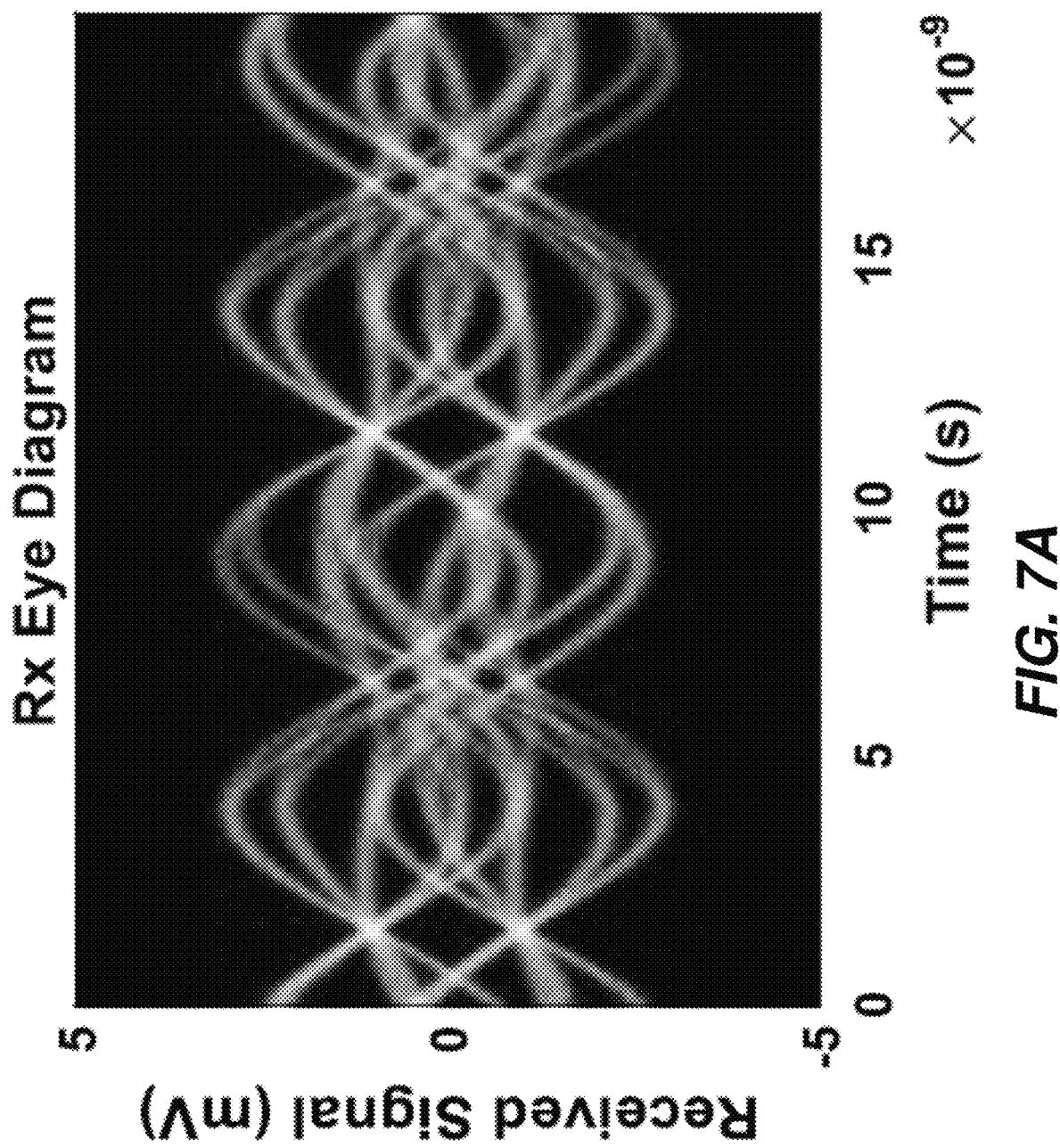
FIG. 7A shows receiver signal based on time.
Figure 7B:
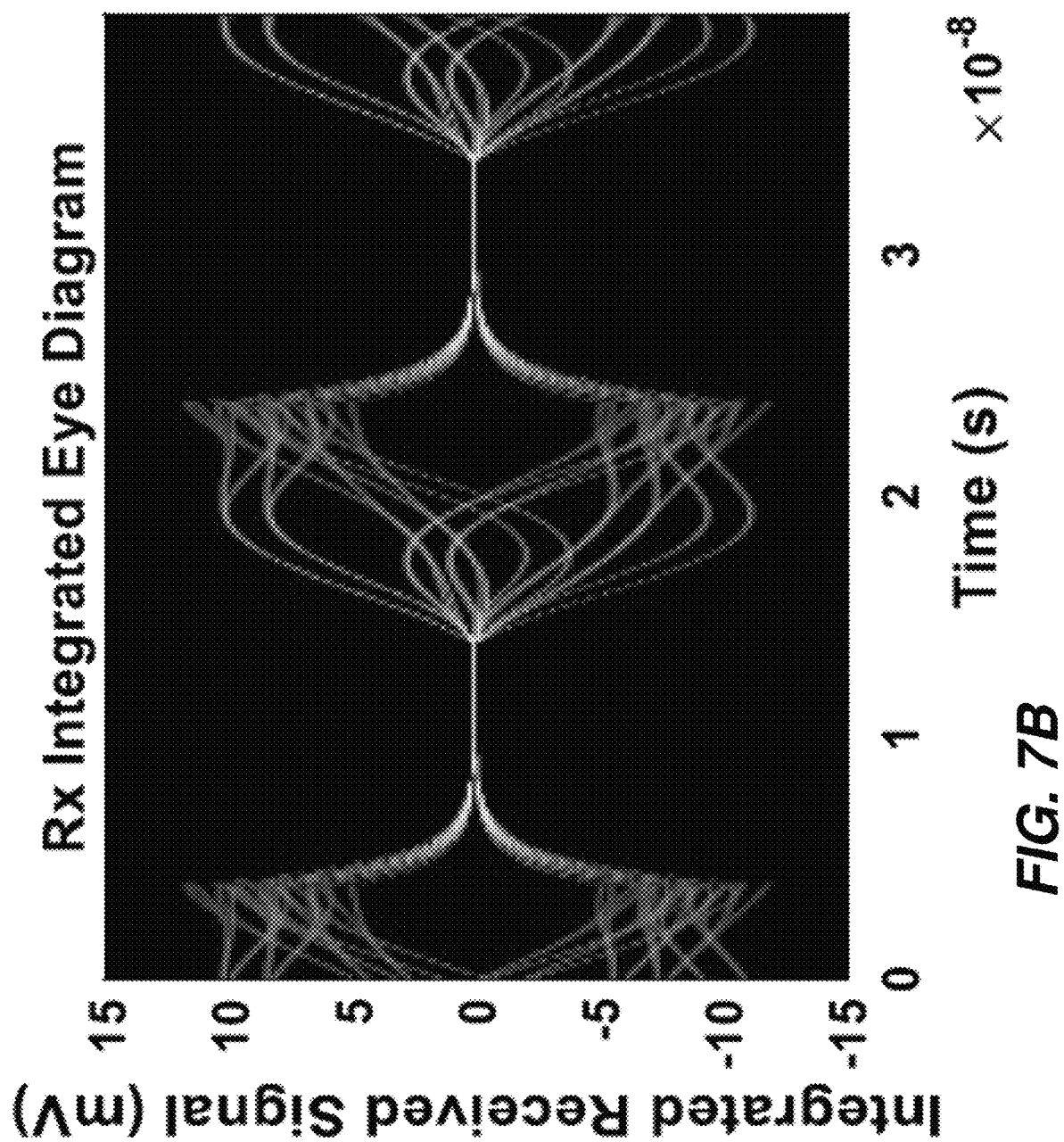
FIG. 7B shows interference received signal based on time.
Figure 8A:
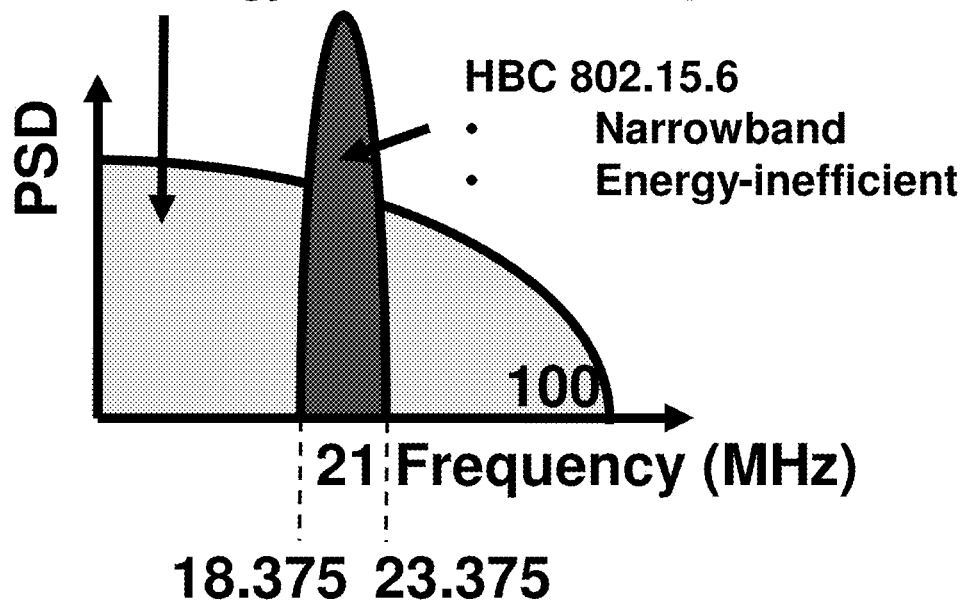
FIG. 8A is a plot comparing broadband and narrowband HBC signaling.
Figure 8B:
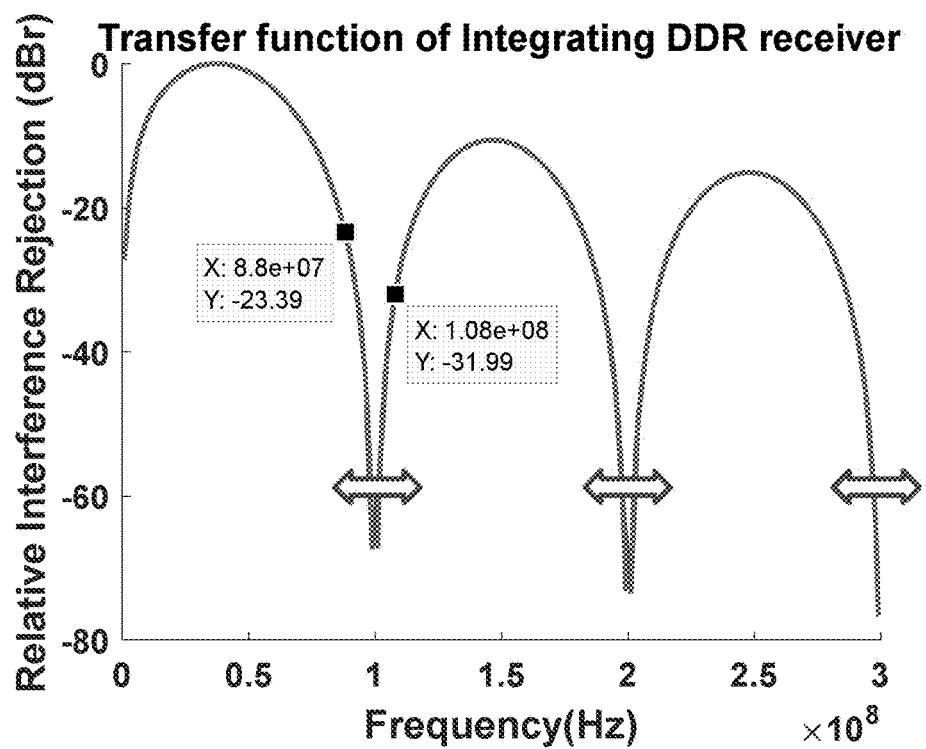
FIG. 8B is a plot showing relative interference rejection vs. frequency.

Results for the presently disclosed signaling system with 100 Mbps NRZ data is shown in FIGS. 7A and 7B. FIG. 7A shows an Rx Eye Diagram for a composite signal having significant interference from an AM radio signal. FIG. 7B shows the same signal when processed by the system 10 of the present disclosure. As shown, the system 10 provides significantly better performance (greater eye opening). A clock and data recover circuit enable sampling at the maximum opening of the integrated eye-diagram of FIG. 7B. FIG. 8A is a plot comparing broadband and narrowband HBC signaling. FIG. 8B is a plot showing relative interference rejection vs. frequency.

In certain embodiments, the system 10 may be used on achieve information exchange between two people, wherein the HBC signals are used to send and/or receive a social media request and/or acceptance (such as through Facebook or LinkedIn) between electronic devices worn by the two people. Such inter-body information exchange is may be utilized in variety of embodiments. For example, in a party, one might want to exchange Facebook friend requests. By turning on a software switch in a smartwatch, a person could allow FB friend request exchange with every person he/she shakes hand with in the party. He/she can then choose to accept or reject the requests individually, at their convenience, on the smart watch or on a computer (synced by the smart watch), by going through the list of received requests. Similarly, in a more professional setting, such as a meeting or a conference, LinkedIn contacts or business cards may be exchanged using dynamic HBC between smartwatches as described herein. The amount of information shared could be selectively controlled using an application on the wearable device or smartwatch.

Steps of various methods described herein can be performed in any order except when otherwise specified, or when data from an earlier step is used in a later step. Exemplary method(s) described herein are not limited to being carried out by components particularly identified in discussions of those methods.

Figure 9:
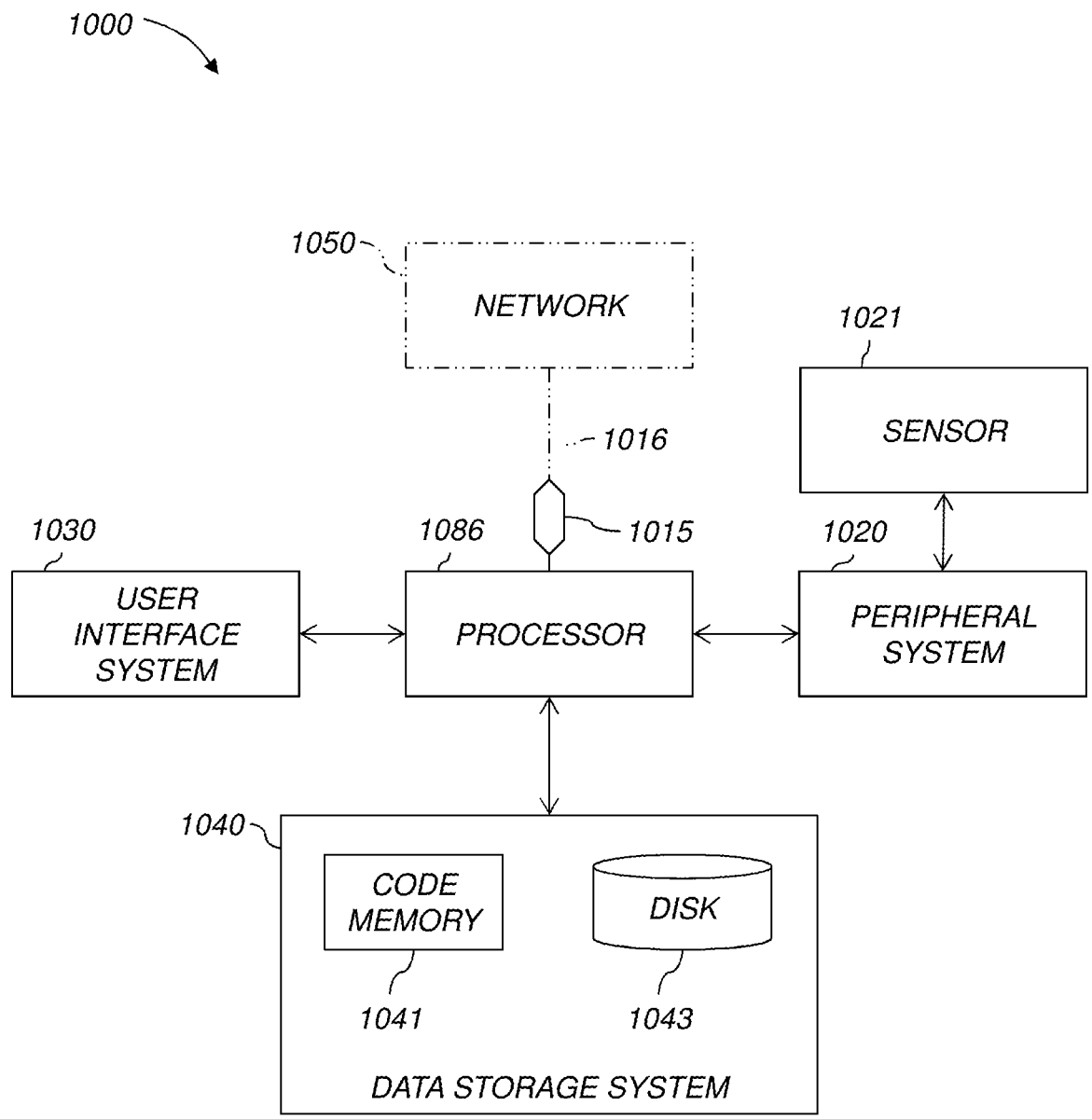
FIG. 9 is a diagram showing the components of an exemplary HBC system according to one embodiment.

FIG. 9 is a high-level diagram showing the components of an exemplary HBC system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The HBC data described herein may be received or sent through a human body via sensors 1021 (or similar transmitters) and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Each of the driver circuits 14 and receivers 22 may include one or more of the processors 1086.

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include capacitive sensors 1021 or other sensors or transmitters for sending and receiving the signals described herein. The processor 1086, upon receipt of digital content records from a device in the peripheral system 1020, can store such digital content records in the data storage system 1040.

The user interface system 1030 can include a mouse, a keyboard, touchscreen, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Various aspects are inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used herein in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A communication interference rejection system comprising:
   a dual data rate (DDR) receiver operatively connected to a device connected to a body of a user, the DDR receiver configured to:
   a. receive a signal transmitted through the body of the user, the signal comprising a relatively small constant amplitude component and a relatively large sinusoidal or modulated interference component, said interference component due to human body antenna effect;
   b. integrate the signal and sample at a sampling time, the sampling time defined as $T_s = n/F_{interference}$, wherein $F_{interference}$ is the frequency of the modulated interference component and n is an integer, leading to a suppressed contribution from an integrated interference; and
   c. to handle variable $F_{interference} > 1/Tb$, wherein Tb is the bit-period, integrate the signal and sample at a sampling time $Tint = n/F_{interference} < Tb$, thereby rejecting arbitrary interference which is an even non-integer multiple of 1/Tb; and
   interference period detection circuitry operatively connected to the DDR receiver that sets $Tint = n/F_{interference} < Tb$.

2. The system according to claim 1, further comprising:
   a driver circuit, the driver circuit configured to transmit a signal from a first person, through the body of the first person to the body of a second person to the DDR receiver.

3. The system of claim 1, wherein the relatively small constant amplitude component comprises an NRZ signal.

4. The system of claim 1, wherein the modulated interference component comprises frequency modulated radio interference.

5. The system according to claim 1, wherein the DDR receiver is operatively connected to a smartwatch worn by the user.

6. The system according to claim 1, wherein said device is implanted within the body of the user.

7. The system according to claim 1, wherein the DDR receiver is used between two individuals handshaking and transferring business cards.

8. The system according to claim 1, wherein the DDR receiver is used between two individuals handshaking and transferring Facebook/Linkedin contact requests.

9. The system according to claim 1, wherein the DDR receiver is used between two individuals handshaking and transferring a secret key for the purpose of secure authentication or device pairing.

10. The system according to claim 1, wherein said signal is a broadband signal comprising a plurality of frequency components.

\* \* \* \* \*